(12) United States Patent
Hironaga et al.

(10) Patent No.: US 8,972,343 B2
(45) Date of Patent: Mar. 3, 2015

(54) STORAGE SYSTEM

(75) Inventors: Ryuji Hironaga, Tokyo (JP); Satoru Nagane, Miyagi (JP)

(73) Assignees: NEC Corporation, Tokyo (JP); NEC Software Tohoku, Ltd., Miyagi (JP)

( * ) Notice: Subject to any disclaimer, the term of this patent is extended or adjusted under 35 U.S.C. 154(b) by 5 days.

(21) Appl. No.: 13/148,525

(22) PCT Filed: Sep. 3, 2009

(86) PCT No.: PCT/JP2009/004337
§ 371 (c)(1),
(2), (4) Date: Aug. 9, 2011

(87) PCT Pub. No.: WO2010/097849
PCT Pub. Date: Sep. 2, 2010

(65) Prior Publication Data
US 2011/0313971 A1    Dec. 22, 2011

(30) Foreign Application Priority Data
Feb. 25, 2009 (JP) .................................. 2009-41894

(51) Int. Cl.
G06F 17/30 (2006.01)
G06F 3/06 (2006.01)

(52) U.S. Cl.
CPC ............. *G06F 3/065* (2013.01); *G06F 3/0617* (2013.01); *G06F 3/067* (2013.01)
USPC ......................................... 707/610; 707/617

(58) Field of Classification Search
USPC .................................................. 707/610, 617
See application file for complete search history.

(56) References Cited

U.S. PATENT DOCUMENTS

| | | | | |
|---|---|---|---|---|
| 6,061,692 A | * | 5/2000 | Thomas et al. | 707/613 |
| 7,136,867 B1 | * | 11/2006 | Chatterjee et al. | 713/171 |
| 2003/0158868 A1 | * | 8/2003 | Zoltan | 707/201 |

(Continued)

FOREIGN PATENT DOCUMENTS

| | | |
|---|---|---|
| CN | 1662905 A | 8/2005 |
| CN | 101361048 A | 2/2009 |
| EP | 1717689 A1 | 2/2006 |

(Continued)

OTHER PUBLICATIONS

International Search Report for PCT/JP2009/004337 mailed Oct. 13, 2009.
Extended European Search Report for PCT/JP2009004337 mailed on Jun. 18, 2012.
Chinese Office Action for CN Application No. 200980156976.5 issued on Sep. 2, 2013 with English Translation.

*Primary Examiner* — Apu Mofiz
*Assistant Examiner* — Fariborz Khoshnoodi
(74) *Attorney, Agent, or Firm* — Sughrue Mion, PLLC

(57) ABSTRACT

A system includes: a copy processing system configured to copy a copy source file system that includes storage data and key data referring to the storage data and being unique depending on the data, from a copy source storage system storing the copy source file system into a copy destination storage system, thereby forming a copy destination file system; and an update data specifying means configured to compare the key data within the copy source file system with the key data within the copy destination file system and specify, as update data, the storage data within the copy source file system referred to by the key data within the copy source file system, the storage data not existing in the copy destination file system. The copy processing system is configured to copy the update data stored within the copy source file system into the copy destination file system.

9 Claims, 15 Drawing Sheets

(56) References Cited

U.S. PATENT DOCUMENTS

2008/0313358 A1* 12/2008 Falkenburg et al. ............ 710/16
2010/0198849 A1* 8/2010 Thomas et al. ............... 707/758
2010/0228764 A1* 9/2010 Sallakonda et al. .......... 707/769

FOREIGN PATENT DOCUMENTS

| JP | 2005235171 A | 9/2005 |
| JP | 2008217306 A | 9/2008 |
| JP | 2009020753 A | 1/2009 |

* cited by examiner

STORAGE SYSTEM

TECHNICAL FIELD

The present invention relates to a storage system, and specifically, relates to a storage system that distributes and stores data into a plurality of storage devices.

BACKGROUND ART

In recent years, as computers have developed and become popular, various kinds of information are put into digital data. As a device for storing such digital data, there is a storage device such as a magnetic tape and a magnetic disk. Because data to be stored has increased day by day and the amount thereof has become huge, a high-capacity storage system is required. Moreover, it is required to keep reliability while reducing the cost for storage devices. In addition, it is required that data can be retrieved later with ease. As a result, such a storage system is desired that is capable of automatically realizing increase of the storage capacity and performance thereof, that eliminates a duplicate of storage to reduce the cost for storage, and that has high redundancy.

Under such circumstances, in recent years, a content address storage system has been developed as shown in Patent Document 1. This content address storage system distributes and stores data into a plurality of storage devices, and specifies a storing position in which the data is stored based on a unique content address specified depending on the content of the data. To be specific, the content address storage system divides predetermined data into a plurality of fragments, adds a fragment that is redundant data thereto, and stores these fragments into a plurality of storage devices, respectively.

Later, by designating a content address, it is possible to retrieve data, that is, fragments stored in storing positions specified by the content address and restore the predetermined data before being divided from these fragments.

Further, the content address is generated so as to be unique depending on the content of data. Therefore, in the case of duplicated data, it is possible to acquire data having the same content with reference to data in the same storing position. Accordingly, it is not necessary to separately store duplicated data, and it is possible to eliminate duplicated recording and reduce the data capacity.

On the other hand, although having high redundancy as described above, the content address storage system also needs a replication of stored data. In this case, the content address storage system executes a process of retrieving a file system of a copy source and copying the file system to a file system that becomes a copy destination. Then, in the case of having executed the copying process once, the content address storage system compares the copy source file system with the copy destination file system and specifies an update file in the copy source file system, thereby being capable of reducing time required for the copying process.

[Patent Document 1] Japanese Unexamined Patent Application Publication No. JP-A 2005-235171

However, in a case that a huge amount of files are stored in a file system to be copied, it takes much processing and time to execute a process of specifying an update file updated after the previous copying process. For example, in the case of specifying an update file by retrieving and comparing update time information of the respective files stored in the copy source file system and the copy destination file system, respectively, it is necessary to retrieve the update time information of all of the files. This causes a problem that time for the copying process and load of the system increase and the performance of the system decreases.

SUMMARY

Accordingly, an object of the present invention is to provide a storage system that is capable of controlling time and load required for the data copying process and inhibiting decrease of the performance of the system.

In order to achieve the object, a replication system of an embodiment of the present invention includes: a copy source storage system configured to store a copy source file system that includes storage data and key data referring to the storage data and being unique depending on the data referred to thereby; and a copy destination storage system configured to become a copy destination of the copy source file system stored in the copy source storage system, the replication system also includes: a copy processing means configured to copy the copy source file system stored in the copy source storage system into the copy destination storage system, and form a copy destination file system in the copy destination storage system; and an update data specifying means configured to compare the key data within the copy source file system with the key data within the copy destination file system and specify, as update data, the storage data within the copy source file system referred to by the key data within the copy source file system, the storage data not existing in the copy destination file system, and the copy processing means is configured to copy the update data stored within the copy source file system into the copy destination file system.

Further, a replication device of another embodiment of the present invention includes: a copy processing means configured to copy a copy source file system stored in a copy source storage system storing the copy source file system that includes storage data and key data referring to the storage data and being unique depending on the data referred to thereby, into a copy destination storage system, and form a copy destination file system in the copy destination storage system; and an update data specifying means configured to compare the key data within the copy source file system with the key data within the copy destination file system and specify, as update data, the storage data within the copy source file system referred to by the key data within the copy source file system, the storage data not existing in the copy destination file system, and the copy processing means is configured to copy the update data stored within the copy source file system into the copy destination file system.

Further, a computer program of another embodiment of the present invention includes instructions for causing an information processing device to realize: a copy processing means configured to copy a copy source file system stored in a copy source storage system storing the copy source file system that includes storage data and key data referring to the storage data and being unique depending on the data referred to thereby, into a copy destination storage system, and form a copy destination file system in the copy destination storage system; and an update data specifying means configured to compare the key data within the copy source file system with the key data within the copy destination file system and specify, as update data, the storage data within the copy source file system referred to by the key data within the copy source file system, the storage data not existing in the copy destination file system, and the copy processing means is configured to copy the update data stored within the copy source file system into the copy destination file system.

Further, a replication method of another embodiment of the present invention includes: copying a copy source file system stored in a copy source storage system storing the copy source file system that includes storage data and key data referring to the storage data and being unique depending on the data referred to thereby, into a copy destination storage system, and forming a copy destination file system in the copy destination storage system; comparing the key data within the copy source file system with the key data within the copy destination file system, and specifying, as update data, the storage data within the copy source file system referred to by the key data within the copy source file system, the storage data not existing in the copy destination file system; and copying the update data stored within the copy source file system into the copy destination file system.

With the configurations as described above, the present invention can realize a storage system that controls time and load required for the data copying process and inhibits decrease of the performance of the system.

EXEMPLARY EMBODIMENTS

<First Exemplary Embodiment>

Figure 1:
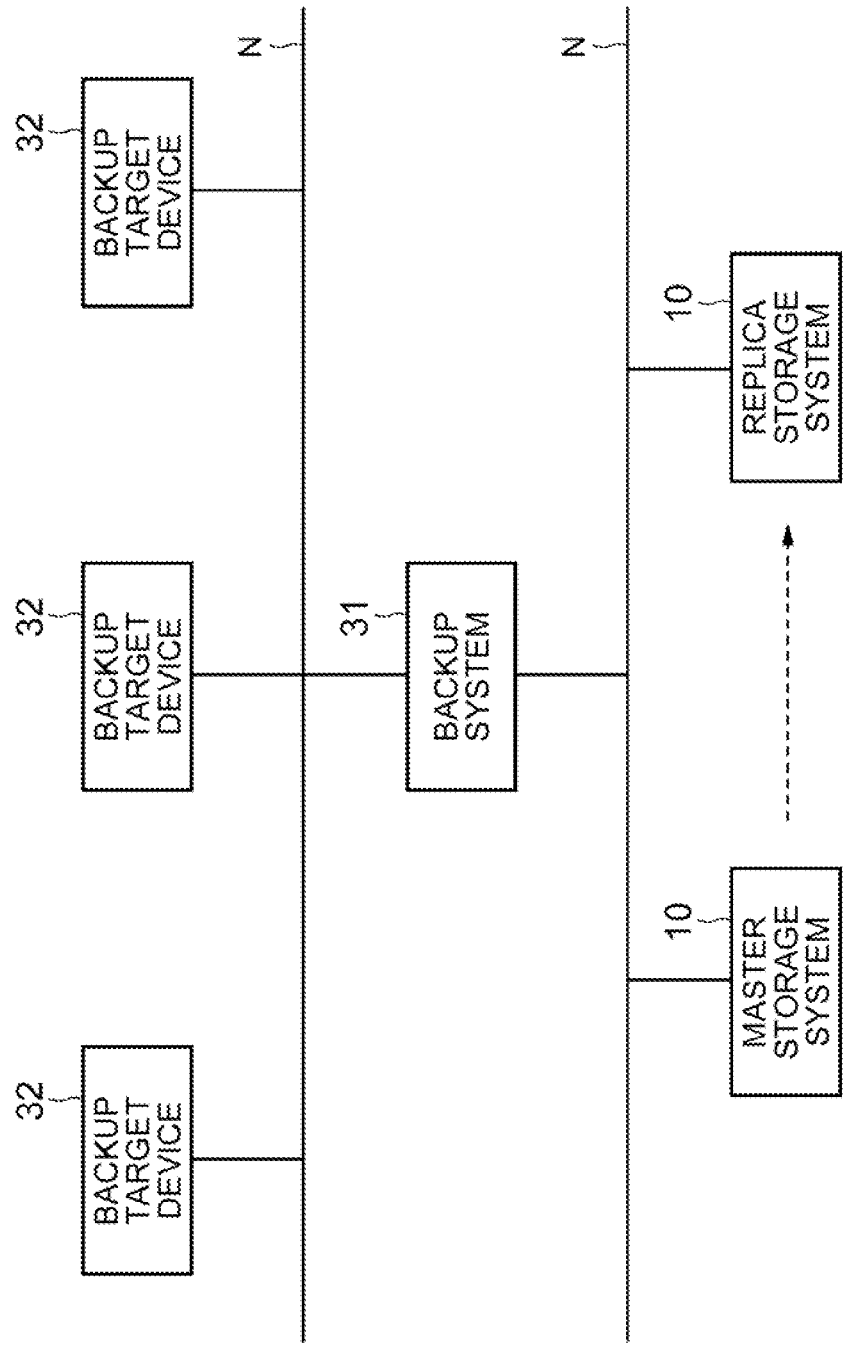
FIG. 1 is a block diagram showing a configuration of a whole system including a storage system of a first exemplary embodiment of the present invention.
Figure 2:
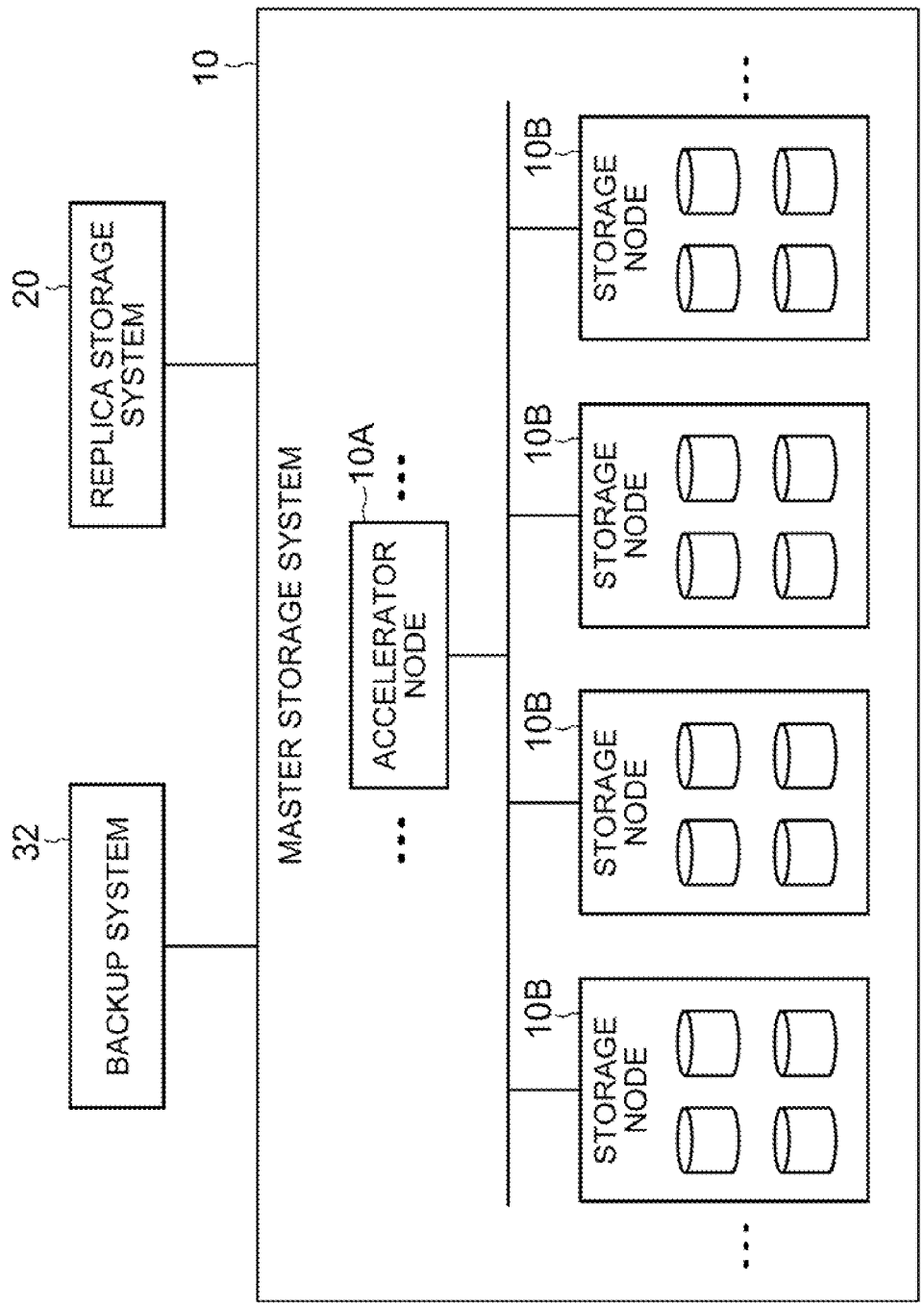
FIG. 2 is a block diagram showing a schematic configuration of the storage system of the first exemplary embodiment of the present invention.
Figure 3:
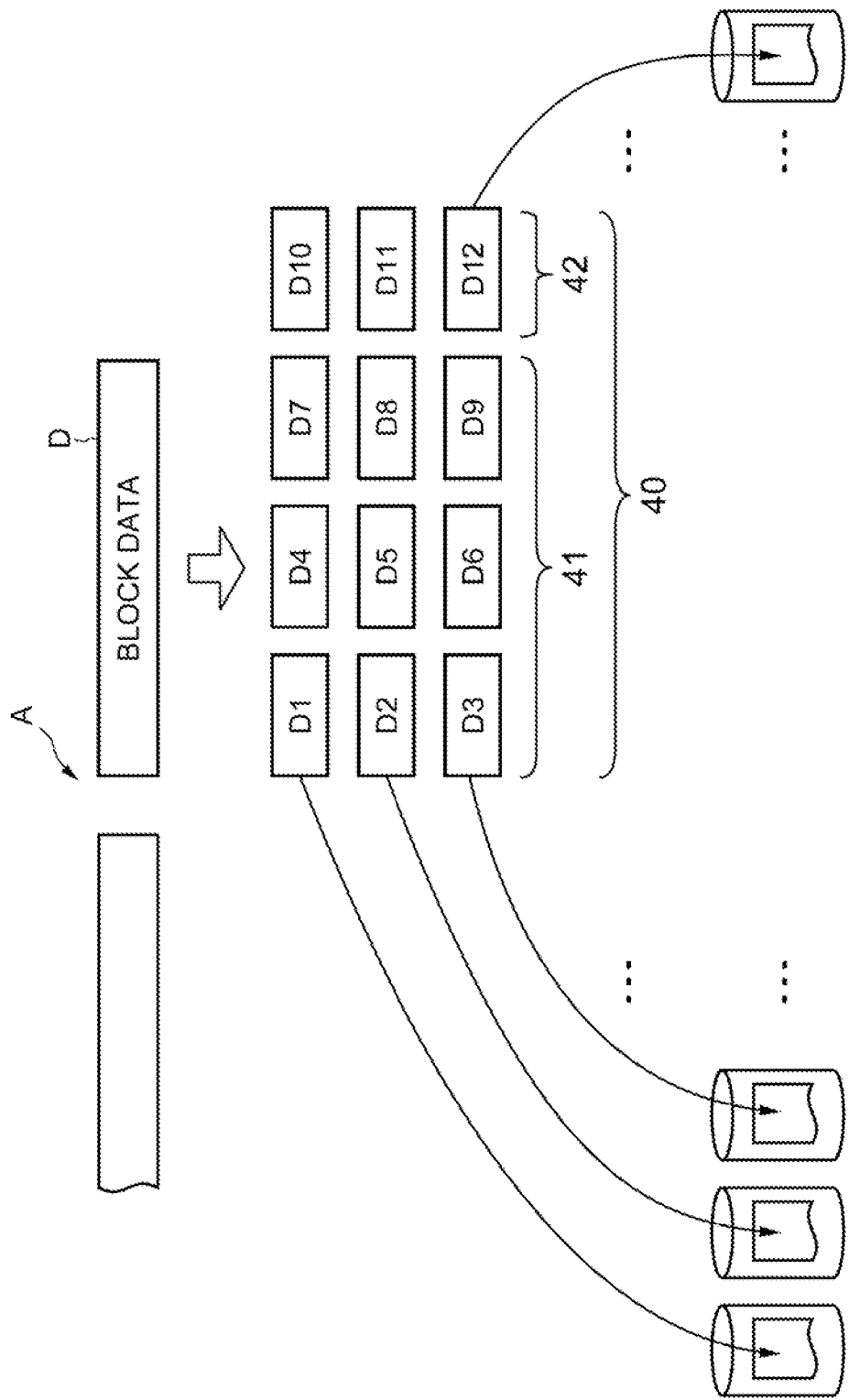
FIG. 3 is an explanation view for explaining an aspect of a data storing process in the storage system disclosed in FIG. 2.
Figure 4:
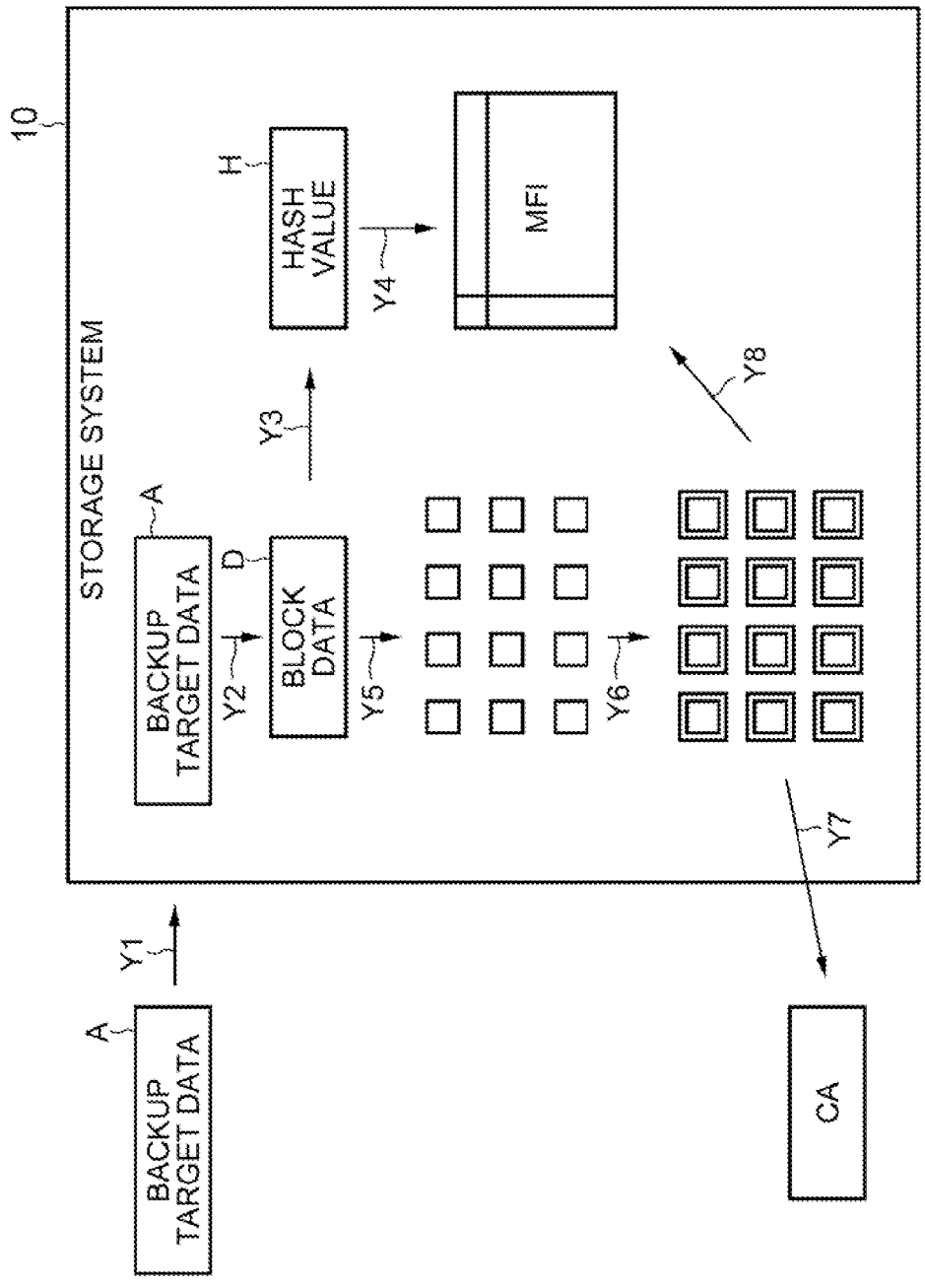
FIG. 4 is an explanation view for explaining an aspect of the data storing process in the storage system disclosed in FIG. 2.
Figure 5:
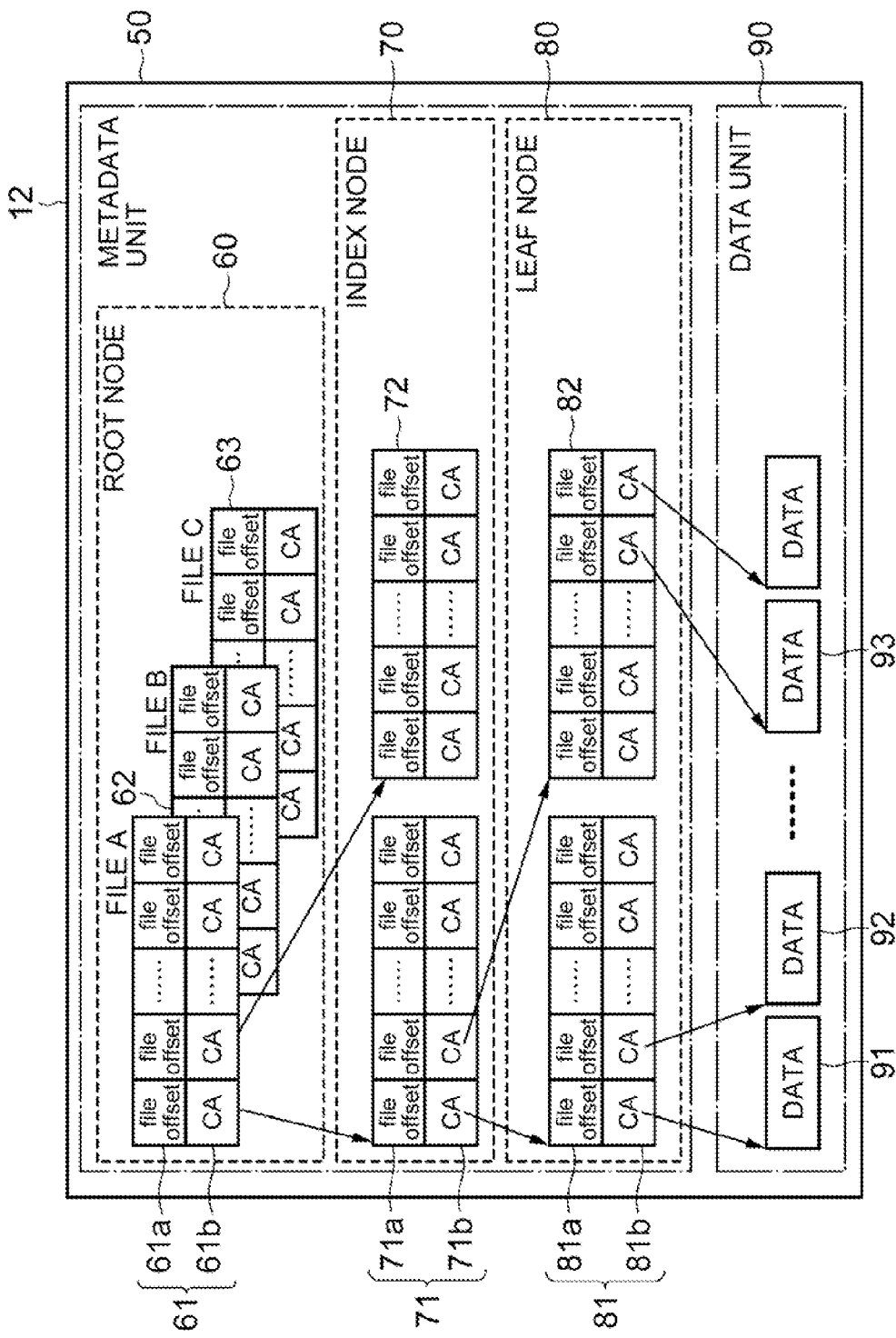
FIG. 5 is a view showing an aspect of storing data into a storage device in the storage system disclosed in FIG. 2.
Figure 6:
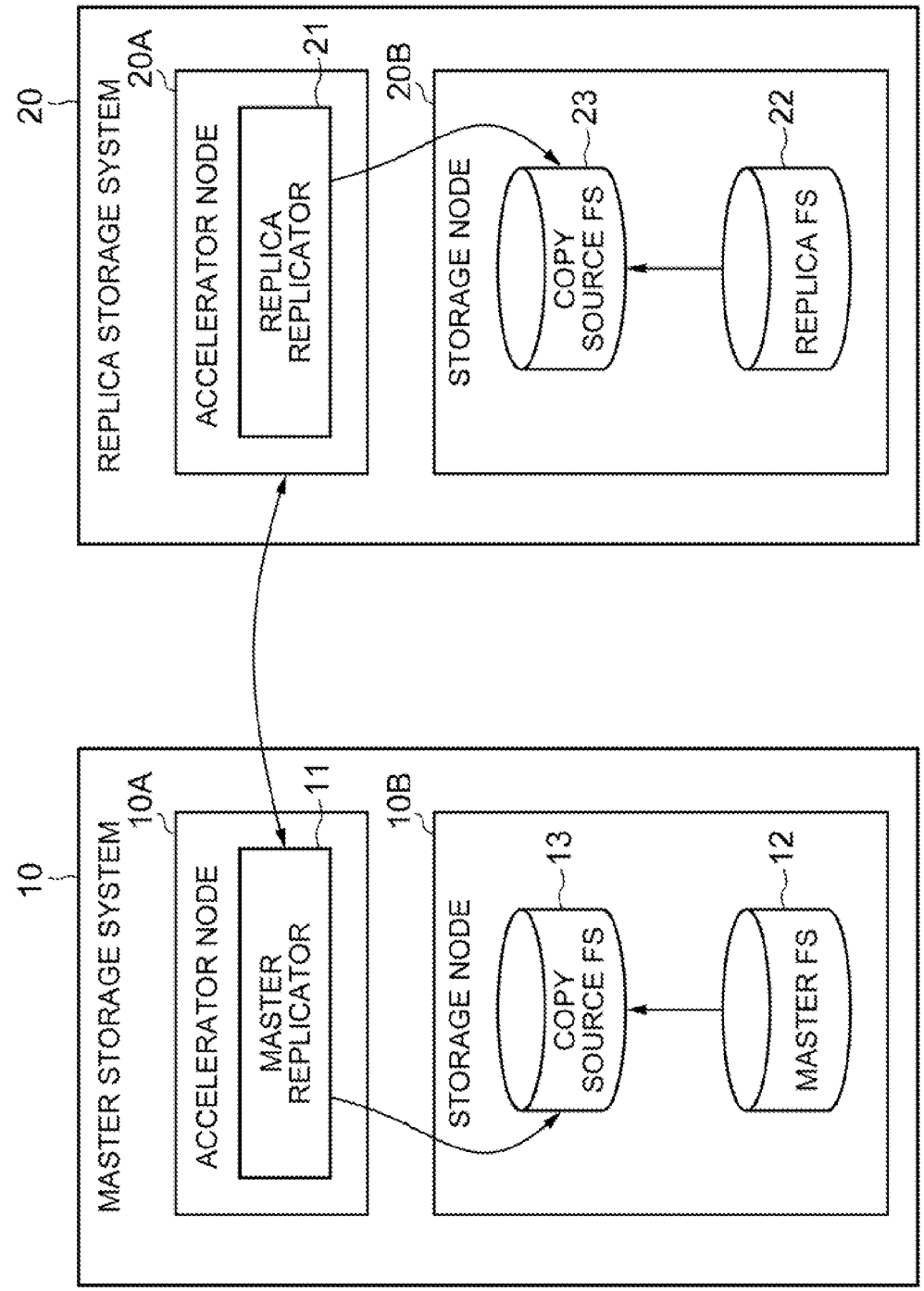
FIG. 6 is a function block diagram showing a configuration of the storage system disclosed in FIG. 2.
Figure 7:
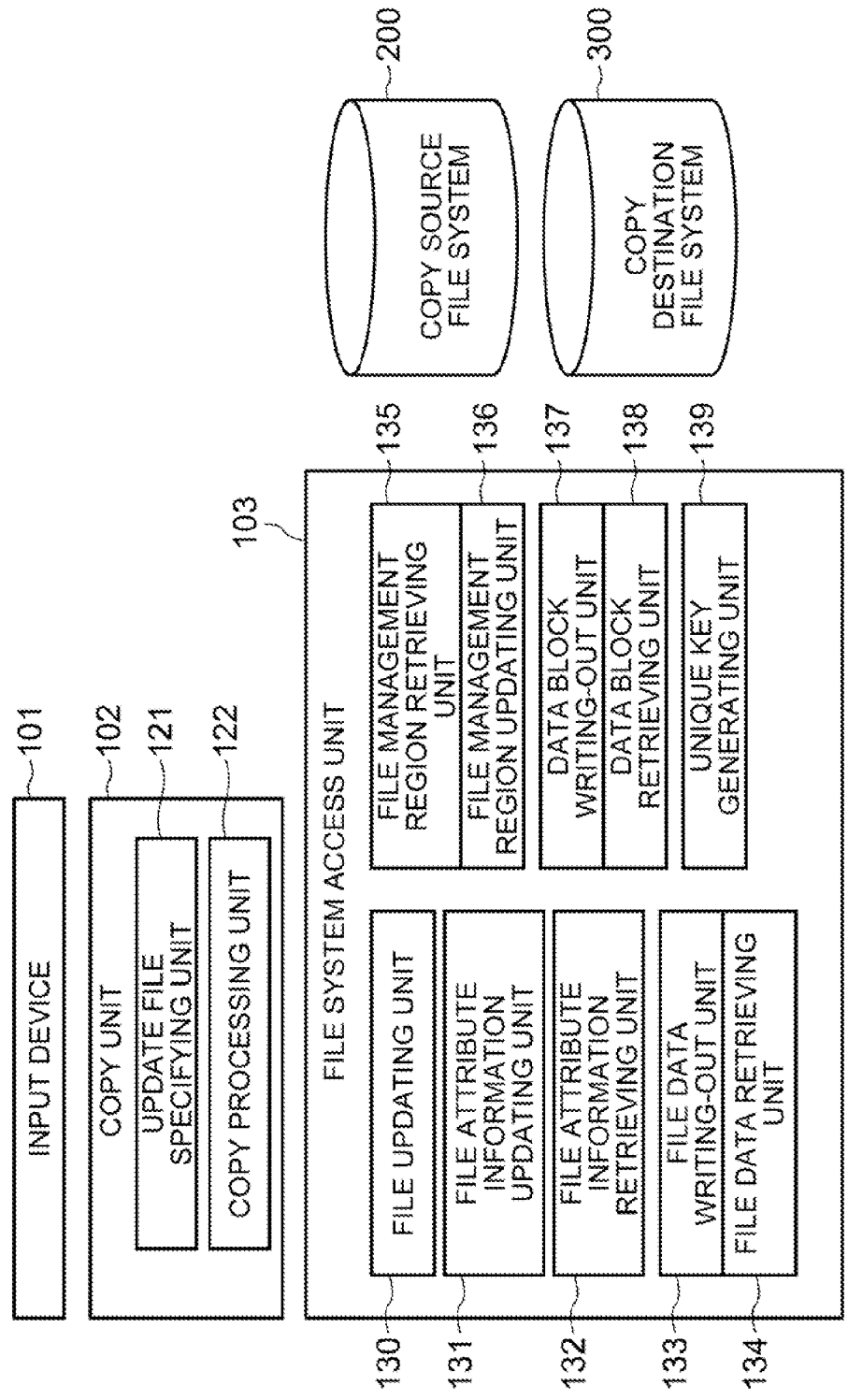
FIG. 7 is a function block diagram showing a configuration of the storage system disclosed in FIG. 2.
Figure 8:
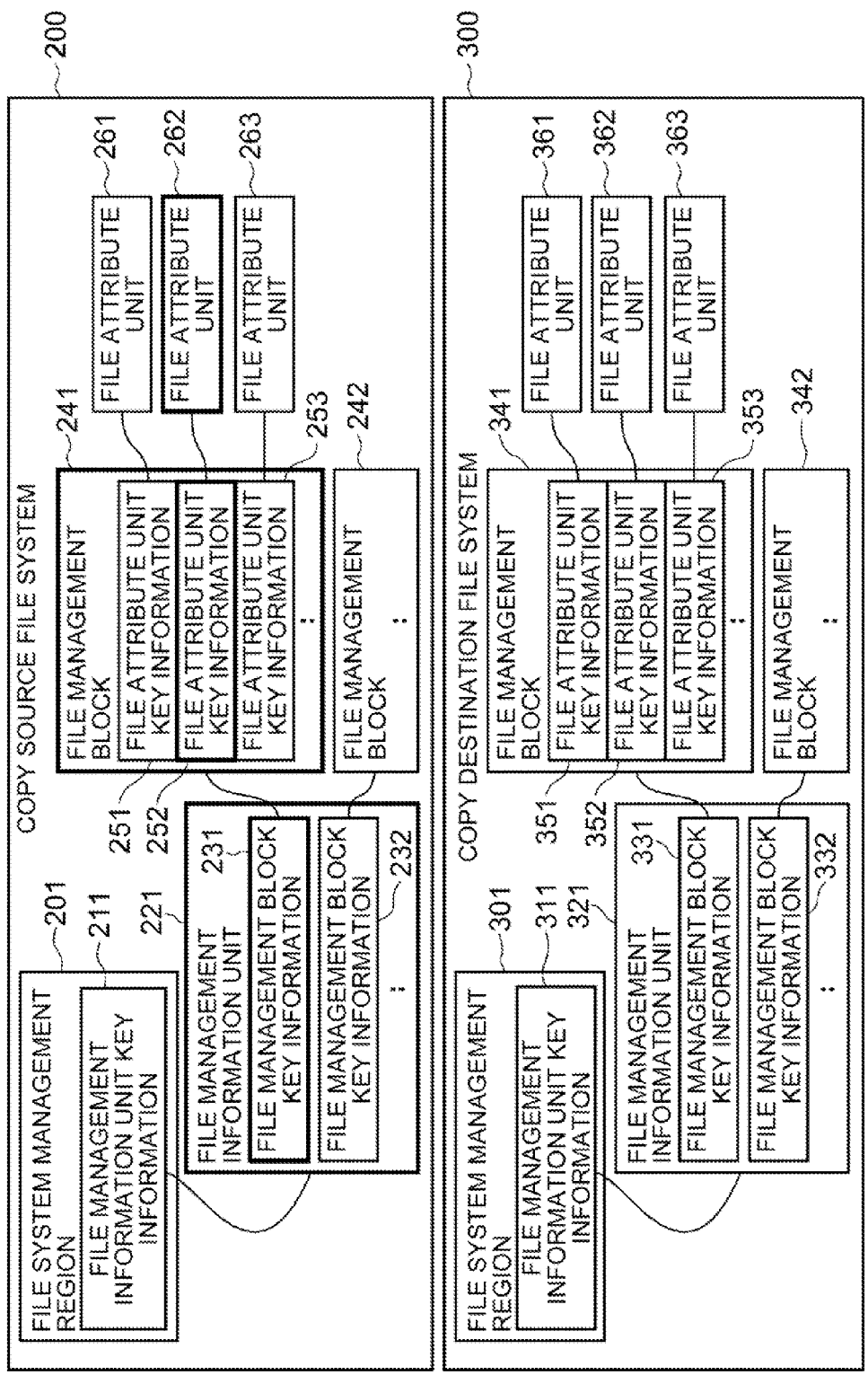
FIG. 8 is a flowchart showing an operation of the storage system disclosed in FIG. 2.
Figure 9:
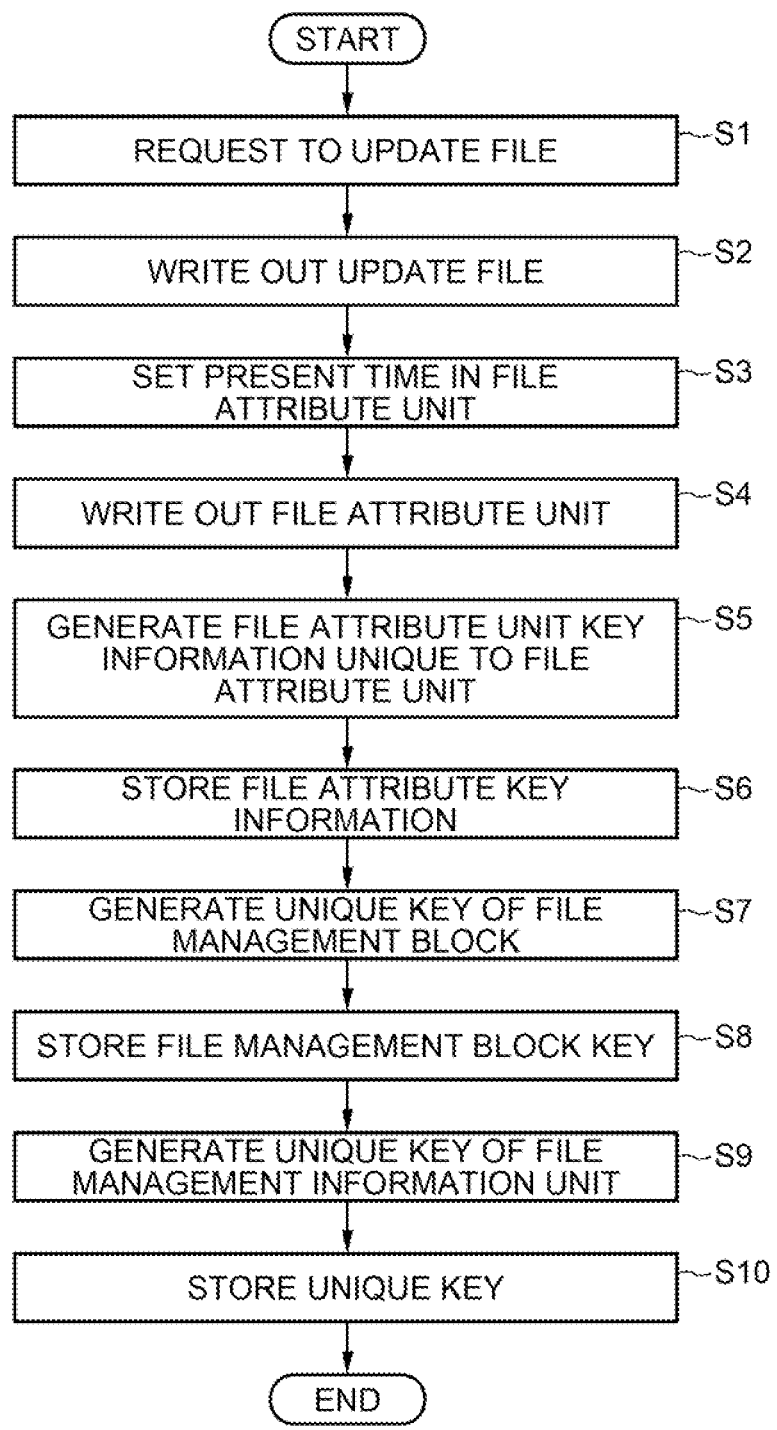
FIG. 9 is a flowchart showing an operation of the storage system disclosed in FIG. 2.

A first exemplary embodiment of the present invention will be described with reference to FIGS. 1 to 14. FIG. 1 is a block diagram showing a configuration of a whole system. FIG. 2 is a block diagram showing a schematic configuration of a storage system. FIGS. 3 and 4 are views showing an aspect of storage of data into the storage system. FIG. 5 is a view showing an example of metadata to be stored. FIGS. 6 and 7 are views showing a configuration for executing replication of the storage system. FIGS. 8 and 9 are flowcharts each showing an operation of the storage system. FIGS. 10 to 14 are views showing aspects of data processing in the storage system.

This exemplary embodiment shows a specific example of a storage system disclosed in a second exemplary embodiment described later. Below, a case of configuring the storage system by connecting a plurality of server computers will be described. However, the storage system of the present invention is not limited to being configured by a plurality of computers, and may be configured by one computer.

As shown in FIG. 1, a storage system of the present invention is equipped with a master storage system 10 and a replica storage system 20 connected via a network N. The master storage system 10 is connected to a backup system 11 that controls a backup process via the network N. The backup system 11 acquires a backup target file stored in a backup target device 12 connected via the network N, and requests the master storage system 10 to store. Thus, the master storage system 10 has a function of storing the backup target file requested to be stored as a backup.

Further, the storage system of the present invention has a function of copying data stored in the master storage system 10 (a copy source storage system) into the replica storage system 20 (a copy destination storage system) as described above, thereby configuring a replication system. The master storage system 10 and the replica storage system 20 have almost the same configurations, and data stored therein are almost identical.

As shown in FIG. 2, the master storage system 10 of this exemplary embodiment is configured by connecting a plurality of server computers. Because the replica storage system 20 employs the same configuration as the master storage system 10, a detailed description thereof will be omitted.

To be specific, the master storage system 10 is equipped with an accelerator node 10A serving as a server computer that controls a storing and reproducing operation by the storage system 10, and a storage node 10B serving as a server computer equipped with a storage device that stores data. The number of the accelerator nodes 10A and the number of the storage nodes 10B are not limited to those shown in FIG. 2, and the master storage system may be configured by connecting more nodes 10A and more nodes 10B.

The accelerator node 10A is equipped with a file system unit (now shown) constructed by installing an accelerator node program. This file system unit has a function of managing backup target files acquired from the backup system 11, data storing positions in which the data are actually stored, and so on, so as to be retrievable later. A description of a more detailed configuration of the accelerator node 10A will be omitted.

The storage node 10B is equipped with a storage node controlling unit (not shown) and a master file system 12 shown in FIG. 5. The storage node controlling unit is realized by installing a storage node program into the storage node 10B.

The master file system 12 is formed in the storage device and, as described later, is equipped with a metadata unit 50 that stores metadata and a data unit 90 that stores division data configuring a file.

A basic data storing process, data retrieving process and storage data structure in the abovementioned master storage system 10 will be described with reference to FIGS. 3 to 5.

Firstly, upon acceptance of an input of backup target data A as shown by arrow Y1 in FIG. 4, the storage system divides the backup target data A into block data D having predetermined capacities (e.g., 64 KB) as shown in FIG. 3 and by arrow Y2 in FIG. 4. Then, based on the data content of the block data D, the storage system calculates a unique hash value H (content identification information) representing the data content (arrow Y3). The storage system calculates the hash value H based on the data content of the block data D, for example, by using a preset hash function. This process is executed by, for example, the accelerator node 10A.

Further, the master storage system 10 checks whether or not the block data D has already been stored in the storage devices by using the hash value E1 of the block data D of the backup target data A. To be specific, the block data D having already been stored is registered in an MFI (Main Fragment Index) file in a state that the hash value H and a content address CA representing a storing position are related. Therefore, in a case that the hash value H of the block data D calculated before being stored exists in the MFI file, the master storage system can determine that the block data D having the same content has already been stored (arrow Y4 in FIG. 4). In this case, the master storage system acquires the content address CA related to the hash value H within the MFI file that coincides with the hash value H of the block data D before being stored, from the MFI file. Then, the master storage system returns this content address CA as the content address CA of the block data D required to be stored. Consequently, the already stored data referred to by using this content address CA is used as the block data D required to be stored, and it becomes unnecessary to store the block data D required to be stored.

Further, the master storage system 10 compresses the block data D considered not to have been stored yet as described above, and divides the data into a plurality of fragment data having predetermined capacities as shown by arrow Y5 in FIG. 4. For example, as denoted by reference symbols D1 to D9 in FIG. 3, the master storage system divides the data into nine fragment data (division data 41). Moreover, the storage system generates redundant data so that the original block data can be restored even if some of the fragment data obtained by division are lost, and adds the redundant data to the fragment data 41 obtained by division. For example, as denoted by reference symbols D10 to D12 in FIG. 3, the storage system adds three fragment data (redundant data 42). Thus, the storage system generates a data set 40 including twelve fragment data composed of the nine division data 41 and the three redundant data.

Further, the master storage system 10 distributes and stores the fragment data composing the data set generated as described above into storage regions formed in the storage devices, respectively. For example, in a case that the twelve fragment data D1 to D12 are generated as shown in FIG. 3, the fragment data D1 to D12 are stored into data storage files respectively formed in the twelve storage devices, respectively (refer to arrow Y6 in FIG. 4).

Further, the master storage system 10 generates and manages a content address CA, which represents the storing positions of the fragment data D1 to D12 stored in the storage devices as described above, that is, the storing position of the block data D to be restored from the fragment data D1 to D12. To be specific, the master storage system 10 generates a content address CA by combining part of the hash value H calculated based on the content of the stored block data D (short hash; e.g., beginning 8bytes of the hash value H) with information representing a logical storing position. Then, this content address CA is returned to a file system within the master storage system 10, namely, to the accelerator node 10A (arrow Y7 in FIG. 4). The accelerator node 10A relates identification information such as the file name of the backup target data with the content address CA and manages in the file system.

In this exemplary embodiment, specifically, present time information that represents present time is included in the content address CA. Thus, the content address CA (key data) referring to stored fragment data (storage data) is set so as to be unique.

Further, the master storage system 10 relates the content address CA of the block data D with the hash value H of the block data D, and the storage nodes 10B each manage in the MFI file (arrow Y8 in FIG. 4). Thus, the content address CA is related with information that specifies the file, the hash value H and so on, and stored into the storage devices of the accelerator node 10A and the storage node 10B.

Furthermore, the master storage system 10 executes a control of retrieving stored backup target data as described above. For example, when the storage system 10 accepts a retrieval request with a specific file designated, the master storage system 10 firstly designates a content address CA composed of short hash as part of a hash value corresponding to the file relating to the retrieval request and information of a logical position, based on the file system. Then, the master storage system checks whether or not the content address CA is registered in the MFI file. In a case that the content address CA is not registered, the requested data is not stored, so that an error response is returned.

On the other hand, in a case that the content address CA relating to the retrieval request is registered, the master storage system specifies a storing position designated by the content address CA and retrieves fragment data each stored in the specified storing position as data requested to be retrieved. Then, the master storage system restores the block data D from the respective fragment data retrieved in response to the retrieval request. Moreover, a storing position management unit 25 connects a plurality of restored block data D to restore as a group of data like the file A, and returns to the accelerator node 10A that is controlling the retrieval Then, as shown in FIG. 5, the content address CA (key data) representing the storing position of the storage data described above is stored as metadata into the metadata unit 50 in a hierarchical structure. To be specific, the metadata unit 50 has a root node 60, an index node 70 and a leaf node 80 that store metadata referring to data stored in a data unit 90 and metadata referring to other metadata. The respective metadata stored in the root node 60, the index node 70 and the leaf node 80 are newly generated or updated and stored by the storage node controlling unit at the time of storing data or at any time.

Furthermore, with reference to FIG. 5, stored data stored in the data unit 90 and the respective metadata (content addresses (key data)) stored in the root node 60, the index node 70 and the leaf node 80 and representing the storing positions of the stored data, which are subjected to a storage process by the storage node controlling unit, will be described in detail.

Firstly, stored data 91, 92 and 93 stored in the data unit 90 are division data obtained by dividing a file that is a storage target stored in the storage system.

Metadata 81 and 82 stored in the leaf node 80 are data representing the storing positions of the stored data 91, 92 and so on. To be specific, as illustrated, the metadata 81 stored in the leaf node 80 has an address part 81b storing a content address (CA) that is address information representing the storing position of the stored data 91 or the like, and an offset part 81*a*, storing position-in-file information (file offset) representing a relative position within a file before division of the stored data 91 or the like.

The CA (content address) stored in the address part 81*b* refers to the stored data 91 or the like stored in the data unit 90, and is unique data to the storing position of the stored data 91. For example, the content address CA is data generated so as to include part of a hash value generated based on the data content of stored data to be referred to and information representing physical position information. In particular, in this exemplary embodiment, when the stored data 91 being referred to is updated, present time information is included in the content address CA referring the stored data. Consequently, the content address CA becomes more unique information depending on data being referred to. Moreover, the file offset stored in the offset part 81*a* is data representing a relative-position-in-file within a file before division of the stored data 91 or the like referred to by the corresponding CA.

Next, metadata 71 and 72 stored in the index node 70 will be described. The metadata 71 stored in the index node 70 is data representing a storing position of the metadata 81 or the like stored in the leaf node 80. To be specific, as illustrated, the metadata 71 stored in the index node 70 has an address part 71*b*, storing a content address (CA) that is address information representing a storing position of the metadata 81 or the like stored in the leaf node 80, and an offset part 71*a* storing position-in-file information (file offset) representing a relative position within a file before division of the stored data. The offset part and the address part are stored so as to correspond to each other.

The content address CA stored in the address part 71*b* is unique data to the storing position of the metadata 81 within the leaf node 80 being referred to. For example, the content address CA is data generated so as to include part of a hash value generated based on the data content of the metadata 81 being referred to and information representing physical position information.

Next, metadata 61, 62 and 63 stored in the root node 60 will be described. The metadata 61 stored in the root node 60 is located on the top of the metadata described above, and is data representing the storing position of the metadata 71 stored in the index node 70. To be specific, as shown in FIG. 5, the metadata 61 stored in the root node 60 has an address part 61*b* storing a content address (CA) that is address information representing a storing position of the metadata 71 or the like stored in the index node 70, and an offset part 61*a* storing position-in-file information (file offset) representing a relative position within a tile before division of stored data located at a reference destination of the CA. The offset part and the address part are stored so as to correspond to each other.

The content address CA stored in the address part 61*b*, is unique data to the storing position of the metadata 71 within the index node 70 being referred to. For example, the content address CA is data generated so as to include part of a hash value generated based on the data content of the metadata 71 being referred to, and information representing physical position information.

Further, the file offset stored in the key part is data representing a relative-position-in-file of stored data located at a reference destination of a corresponding content address CA. In other words, the file offset represents the order in a file before division of the stored data 91 or the like finally specified by being referred to by the metadata 81, 82 or the like within the leaf node 80 referred to by the metadata within the index node 70 referred to by the content address CA.

The metadata denoted by reference numeral 61 is metadata corresponding to the file A. In other words, by using the stored data referred to by following all of the metadata (the metadata 71, 81 and so on within the index node 70 and the leaf node 80) referred to by the metadata 61, it is possible to configure the file A before division.

Thus, at the time of storing a file, the storage node controlling unit divides the file and stores the division data into the data unit 90. Then, the storage node controlling unit hierarchically generates or updates the respective metadata referring to the stored data as shown in FIG. 5. At this moment, the storage node controlling unit generates a content address (CA) of metadata so as to refer to other existing metadata or stored data located in lower hierarchies, thereby being capable of inhibiting duplicate storage of metadata and stored data.

In particular, in this exemplary embodiment, as described above, when the stored data 91 being referred to is updated, present time information is included into the content address CA within the leaf node 80 referring to this stored data. Thus, the content address CA becomes information that is more unique to the data being referred to. Then, based on the content address CA that is unique information, content addresses CA of the upper hierarchies (the index node, the root node) referring to the metadata including the content address CA that is unique information are also updated so as to include the unique information. For example, the content address CA in this exemplary embodiment is generated so as to be unique by a unique key generation unit 139 (a unique information generating means) described later.

However, the content address CA is not limited to including present time information necessarily. As described above, the content address CA may include part of a hash value of data of a reference destination. With this, it is also possible to use the content address CA as unique key data referring to specific data.

Further, at the time of retrieving a file, the storage node controlling unit follows the reference destinations of the respective metadata to retrieve the stored data 91 and so on being referred to, and generates and retrieves the file. For example, at the time of retrieving the file A when data are stored as shown in FIG. 5, the storage node controlling unit follows the metadata 61 within the root node 60 referring to the file A, the metadata within the index node 70 referred to by the metadata 61 and the metadata within the leaf node 80, and retrieves a plurality of stored data finally referred to. Then, the storage node controlling unit reproduces the file in the order represented by the file offsets within the respective metadata.

Next, a configuration and an operation for executing replication of the storage system will be described with reference to FIGS. 6 to 8.

Firstly, in the master storage system 10 and the replica storage system 20 configuring the storage system of this exemplary embodiment, as shown in FIG. 6, the accelerator nodes 10A and 20A are respectively equipped with replicators 11 and 21 having a function of executing replication. These replicators 11 and 21 execute a process of copying the master file system 12 stored in the master storage system 10, into the replica storage system 20 in cooperation with each other.

A specific function of the storage system in order to execute replication will be described with reference to FIG. 7. The functions will be described assuming the configuration shown in FIG. 7 is within the accelerator node 10A configuring the master storage system 10. However, this configuration may be installed in any computer within the storage system.

As shown in FIG. 7, the storage system is equipped with an input device 101, a copy unit 102, and a file system access unit 103. Moreover, the storage system includes a copy source file system 200 created by the file system access unit 103 and a copy destination file system 300.

The copy source file system 200 (a copy source FS 13) is generated by copy of the master file system (master FS) 12 in the master storage system 10 at the time of replication. In a like manner, the copy destination file system 300 (a copy destination FS 23) is generated by copy of the replica file system (replica FS) 22 in the replica storage system 20 at the time of replication. Thus, at the time of actual replication, copies of the copy source file system and the copy destination file system are used. However, for the convenience of description, the description will be made below assuming the master file system 12 is the copy source file system 200 and the replica file system 22 is the copy destination file system 300.

The copy unit 102 is equipped with an update file specifying unit 121 and a copy processing unit 122 as shown in FIG. 7. Moreover, the file system access unit 103 is equipped with a file updating unit 130, a file attribute information updating unit 131, a file attribute information retrieving unit 132, a file data writing-out unit 133, a file data retrieving unit 134, a file management region retrieving unit 135, a file management region updating unit 136, a data block writing-out unit 137, a data block retrieving unit 138, and a unique key generating unit 139.

The copy unit 102 and the file system access unit 103 are realized by installation of a program into an arithmetic device of the accelerator node 10A. The program is provided to the accelerator node 10A, for example, in a state stored in a storage medium such as a CD-ROM. Alternatively, the program may be stored in a storage device of another server computer on the network and provided to the accelerator node 10A from the other computer via the network.

Figure 10:
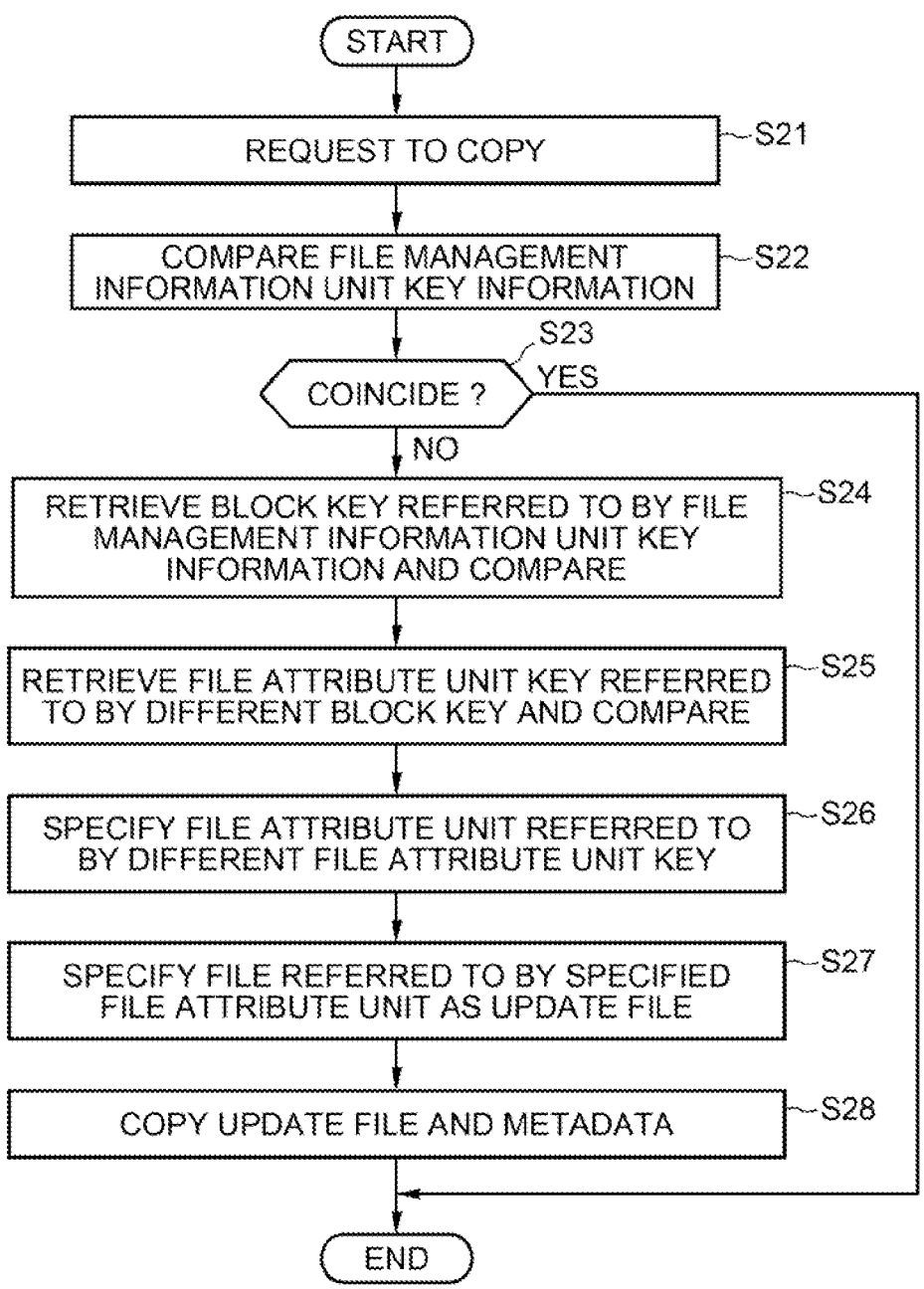
FIG. 10 is a view showing an aspect of data processing in the storage system disclosed in FIG. 2.
Figure 11:
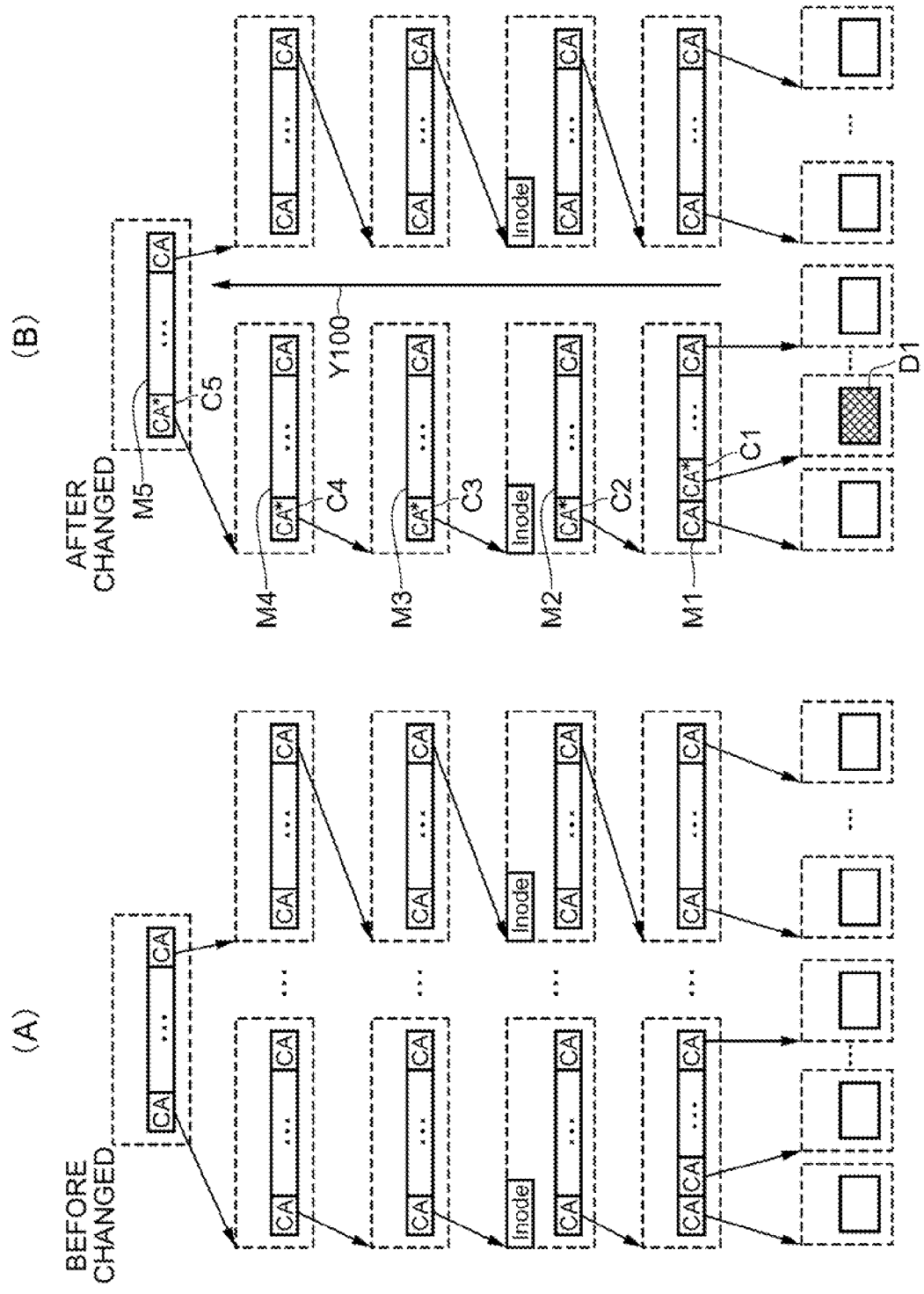
FIG. 11 is a view showing an aspect of data processing in the storage system disclosed in FIG. 2.

Next, an operation of the storage system with the above-mentioned configuration will be described with reference to a data structure view of FIG. 8 and flowcharts of FIGS. 9 and 10. Firstly, an operation when data within the master file system 12 stored in the master storage system 10, namely, data within the copy source file system 200 is updated will be described. To be specific, an operation when data (storage data) referred to by a file attribute part 262 stored in the copy source file system 200 is updated will be described.

Firstly, when the file system access unit 103 accepts a request to update a file (step S1), the file updating unit 130 receives a file number and update file data. Then, the file updating unit 130 passes the file number and the update file data to the file data writing-out unit 133, whereby the update file data is written out (step S2).

Subsequently, after the update file data is written out, the file updating unit 130 passes the file number to the file attribute information retrieving unit 132, and searches for file attribute part key information 252. After searching for the file attribute part key information 252, the file updating unit 130 passes the file attribute part key information 252 to the data block retrieving unit 138, thereby retrieving the file attribute part 262.

Subsequently, the file updating unit 130 sets present time information representing present time as file update time information stored in the retrieved file attribute part 262 (step S3). Consequently, the file attribute part 262 referring to the update file data becomes data (key data) that is unique to the update file data. In other words, in this case, the file updating unit 130 functions as a unique information generating means configured to include the data (key data) unique to the update file data into the file attribute part 262 referring to the update file data.

Then, the file updating unit 130 passes the file number and the file attribute part 262 to the file attribute information updating unit 131. Upon acceptance, the file attribute information updating unit 131 passes the file attribute part 262 to the data block writing-out unit 137. Then, the data block writing-out unit 137 writes out the file attribute part 262 (step S4).

Subsequently, the data block writing-out unit 137 acquires file attribute part key information that is generated by the unique key generating unit 139 and is unique to the file attribute part 262, and returns to the file attribute information updating unit 131. In other words, when the file attribute part 262 being referred to changes, the unique key generating unit 139 (a unique information generating means) generates unique file attribute part key information (key data) referring to the file attribute part 262 (step S5). Then, the file attribute information updating unit 131 stores the file attribute part key information returned from the data block writing-out unit 137 into the file attribute part key information 252 corresponding to the file number in a file management block 241 (step S6).

Subsequently, in accordance with the change of the file attribute part key information 252 in the file management block 241, a unique key (key data) of the file management block 241 is generated by using the unique key generating unit 139 (step S7). Then, the unique key of the file management block 241 generated by the unique key generating unit 139 is stored into file management block key information 231 in a file management information part 221 (step S8).

Subsequently, in accordance with the change of the file management block key information 231, a new unique key (key data) of the file management information part 221 is generated by using the unique key generating unit 139 (step S9). Then, the generated unique key of the file management information part 221 is stored into file management information part key information 211 (step S10).

Data unique to data of a reference destination such as present time information and a unique key is a content address referring to update file data or other metadata, or data included in a content address.

For example, a file system before changed shown in FIG. 11A and a file system after changed shown in FIG. 11B will be considered. It is assumed that "Data" denoted by reference symbol D1 of FIG. 11B is updated from the file system of FIG. 11A. The value of a unique content address CA* (C1) referring to the Data (D1) is changed. In accordance with this, the content of metadata M1 including the content address CA* (C1) is also changed, and therefore, the value of the content address CA* (C2) unique to the metadata M1 and referring to the metadata M1 is changed.

Since metadata M2 including the content address CA* (C2) is also changed, the value of the content address CA* (C3) unique to the metadata M2 and referring to the metadata M2 is changed. Since metadata M3 including the content address CA* (C3) is also changed, the value of the content address CA* (C4) unique to the metadata M3 and referring to the metadata M3 is changed. Since metadata M4 including the content address CA* (C4) is also changed, the value of the content address CA* (C5) unique to the metadata M4 and referring to the metadata M4 is changed. Then, the content of metadata M5 including the content address (C5) is also changed.

Thus, when data stored in the storage system is updated, a content address is successively changed as shown by arrow Y100 of FIG. 11B In other words, in order from a content address referring to the update data located in a lower hierarchy to a content address located in an upper hierarchy referring to the metadata including the content address, the order of the content addresses is changed.

Next, replication in the master storage system 10 and the replica storage system 20, namely, the process of copying the copy source file system 200 will be described. It is assumed that, previously, the copy source file system 200 is replicated from the master storage system 10 to the replica file system 20 and a copy source file system that is the same file system as the copy source file system 200 is stored in the replica storage system 20.

In the copying process after that, firstly, the update file specifying unit 121 (an update data specifying means) specifies a file updated after the previous copying process. After that, the copy processing unit 122 (a copy processing means) copies the update file having been specified and metadata. Below, a specific description will be made with reference to FIG. 10.

Firstly, upon acceptance of a copying request by input from the input device 101 (step S21), the copy unit 102 passes information specifying the copy source file system 200 and the copy destination file system 300 to the update file specifying unit 121.

Subsequently, the update file specifying unit 121 causes the file management region retrieving unit 135 of the file system access unit 103 to retrieve a file system management region 201 of the copy source file system 200 and a file system management region 301 of the copy destination file system 300. Subsequently, the update file specifying unit 121 compares the file management information part key information 211 of the file system management region 201 with file management information part key information 311 of the file system management region 301 (step S22).

At this moment, in a case that the two file management information part key information coincide with each other (Yes at step S23), it is determined that there is no updated file, and the update file specifying unit 121 ends the process.

On the other hand, in a case that the two file management information part key information do not coincide (No at step S23), which means there is an updated file, the update file specifying unit 21 specifies the update file. To be specific, the update file specifying unit 121 passes the file management information part key information 211 to the data block retrieving unit 138, and retrieves the file management information part 221 referred to by the file management information part key information 211. Then, file management block key information of the file management information part 221 and file management block key information of the file management information part 321 within the copy destination file system 300 are compared (step S24). After that, based on the result of the comparison, different file management block key information 22 is specified. Here, it is assumed that the file management block key information 231 and the file management block key information 331 are different.

Subsequently, file attribute part key information 251 to 253 within the file management block 241 and file attribute part key information 351 to 353 within the file management block 341 referred to by the different file management block key information 231 and 331, respectively, are compared (step S25). To be specific, the file management block key information 231 is passed to the data block retrieving unit 138, and the file management block 241 is retrieved. On the other hand, the file management block key information 331 is passed to the data block retrieving unit 138, and the file management block 341 is retrieved. The file attribute part key information included in the retrieved file management block 241 and the file attribute part key information included in the retrieved file management block 341 are compared, whereby different file attribute part key information is specified (step S26). Here, it is assumed that the file attribute part key information 252 and the file attribute part key information 352 are different. Then, a file represented by the file attribute part key information 252 as the different information is specified as an updated file (step S27).

After that, the copy unit 102 receives update file information from the update file specifying unit 121 and passes the update file information to the copy processing unit 122, thereby executing a copying process. At this moment, the copy unit 102 copies the update file having been specified, metadata that refers to the update file, and metadata of an upper hierarchy referring to the abovementioned metadata into the copy destination file system 300. Thus, it is possible to copy only data in the copy source file system 200 updated from data in the copy destination file system 300 into the replica storage system 20.

Next, examples of the abovementioned copying process will be described with reference to FIGS. 12 to 14. In the respective examples shown in the drawings, the copy destination file system 300 is shown on the left side, and the copy source file system 200 is shown on the right side. That is to say, the drawings each show a state that data in the copy source file system 200 has been updated from the copy destination file system 300. In these drawings, it is assumed that storage target data is stored in a part denoted by "Inode."

Figure 12:
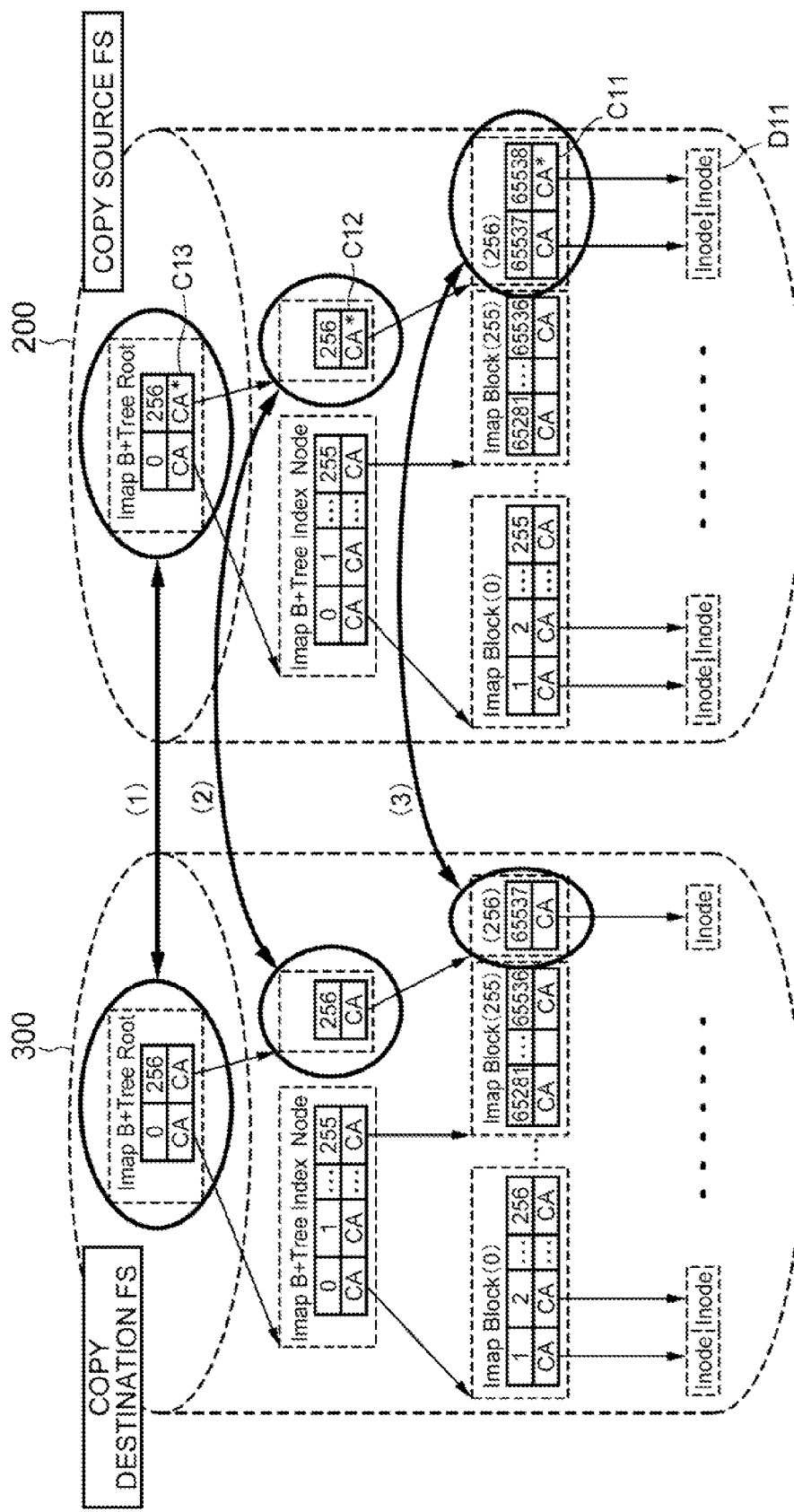
FIG. 12 is a view showing an aspect of data processing in the storage system disclosed in FIG. 2.

In the beginning, in the example of FIG. 12, it is assumed that data stored in "Inode" denoted by reference symbol D11 has been updated. Firstly, when content addresses CA included in metadata located in the root nodes of the highest hierarchy are compared, the content address CA* denoted by reference symbol C13 within the copy source file system 200 is different from the content address CA within the copy destination file system 300 (refer to reference numeral (1)). In other words, the content address CA* denoted by reference symbol C13 within the copy source file system 200 does not exist in the copy destination file system 300. Therefore, metadata in the index node of a lower hierarchy referred to by the content address CA* denoted by reference symbol C13 is checked.

Subsequently, when content addresses CA located in the index nodes are compared, the content address CA* denoted by reference symbol C12 within the copy source file system 200 is different from the content address CA within the copy destination file system 300 (refer to reference numeral (2)). In other words, the content address CA* denoted by reference symbol C12 does not exist in the copy destination file system 300. Therefore, metadata in the leaf node of a lower hierarchy referred to by the content address CM denoted by reference symbol C12 is checked.

Subsequently, when content addresses CA located in the leaf nodes are compared, the content address CA* denoted by reference symbol C11 within the copy source file system 200 is different from the content address CA within the copy destination file system 300 (refer to reference numeral (3)). In other words, the content address CA* denoted by reference symbol C11 does not exist in the copy destination file system 300. Therefore, the data stored in the Inode denoted by reference symbol D11 referred to by the content address CA* denoted by reference symbol C11 is specified as update data.

After that, the data specified as the update data within the copy source file system 200 and the metadata having been followed are copied into the copy destination file system 300.

Thus, in the present invention, by comparing metadata within the copy source file system with metadata within the copy destination file system, respectively, from the highest hierarchy and following different content addresses, it is possible to specify data having been updated. Therefore, there is no need to compare all of the data within the respective file systems, and it is possible to easily and speedily specify update data by comparing metadata that refer to storage data. As a result, it is possible to control time and load required for the data copying process, and it is possible to inhibit decrease of the performance of the system.

Figure 13:
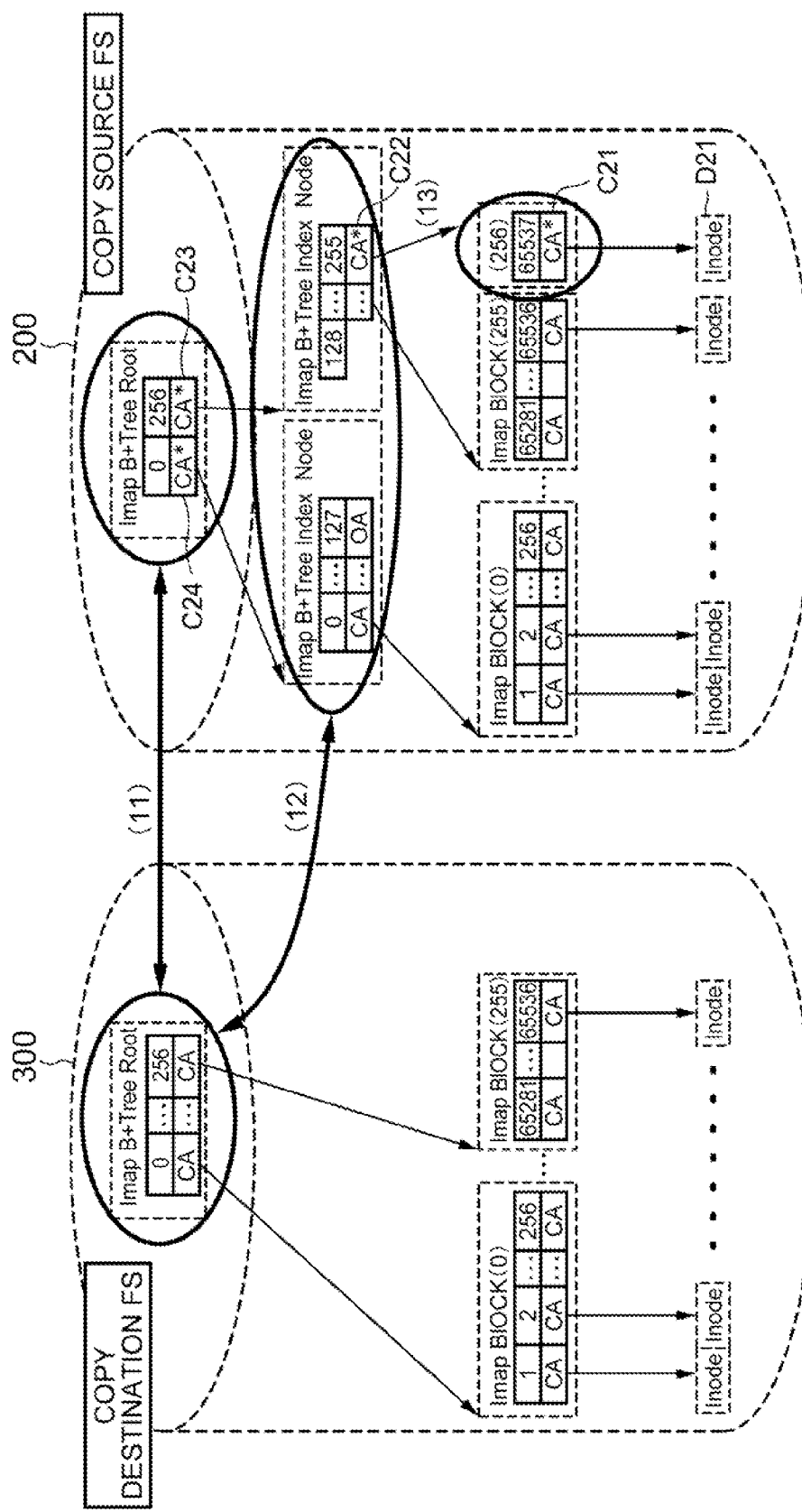
FIG. 13 is a view showing an aspect of data processing in the storage system disclosed in FIG. 2.

Next, in the example of FIG. 13, it is assumed that data stored in "Inode" denoted by reference symbol D21 has been updated and the hierarchies of metadata have increased. Firstly, when content addresses CA included in metadata located in the root nodes of the highest hierarchy are compared, the content addresses CA* denoted by reference symbols C23 and C24 within the copy source file system 200 are different from the content addresses CA within the copy destination file system 300 (refer to reference numeral (11)). In other words, the content addresses CA* denoted by reference symbols C23 and C24 within the copy source file system 200 do not exist in the copy destination file system 300. Therefore, metadata in the index nodes of a lower hierarchy referred to by the content addresses CA* denoted by reference symbols C23 and C24 are checked.

Subsequently, when content addresses CA located in the index nodes are compared, the content address CA* denoted by reference symbol C22 within the copy source file system 200 is different from the content address CA within the copy destination file system 300 (refer to reference numeral (12)). In other words, the content address CA* denoted by reference symbol C22 does not exist in the copy destination file system 300. Therefore, metadata in the leaf node of a lower hierarchy referred to by the content address CA* denoted by reference symbol C22 refers is checked.

Subsequently, when content addresses CA located in the leaf nodes are compared, the content address CA* denoted by reference symbol C21 within the copy source file system 200 is different from the content address CA within the copy destination file system 300 (refer to reference numeral (13)). In other words, the content address CA* denoted by reference symbol C21 does not exist in the copy destination file system 300. Therefore, the data stored in the Inode denoted by reference symbol D21 referred to by the content address CA* denoted by reference symbol C21 is specified as update data.

After that, the data specified as the update data within the copy source file system 200 and the metadata having been followed are copied into the copy destination file system 300.

Figure 14:
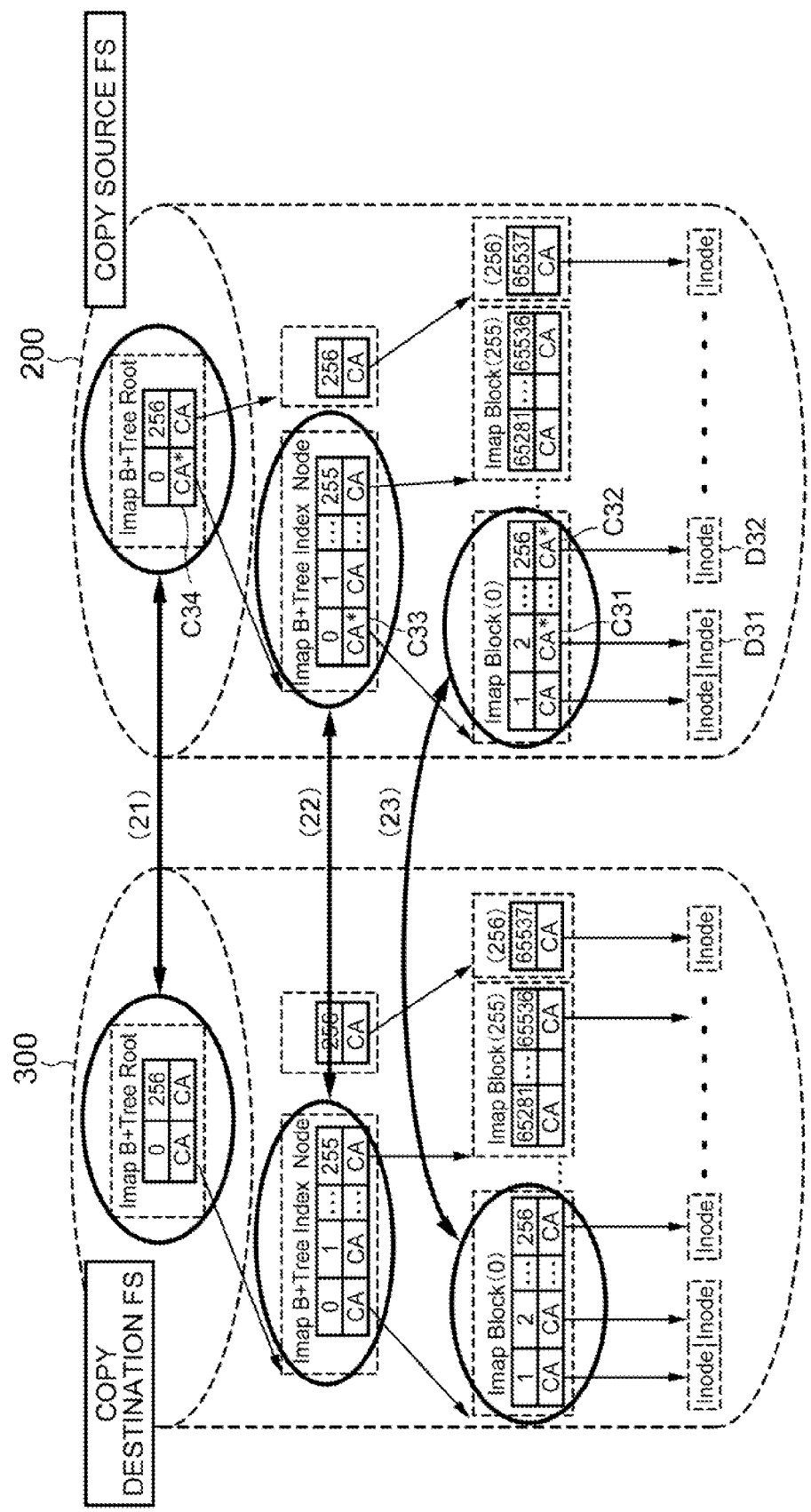
FIG. 14 is a view showing an aspect of data processing in the storage system disclosed in FIG. 2.

Next, in the example of FIG. 14, it is assumed that data stored in "Inode" denoted by reference symbols D31 and D32 have been updated. Firstly, when content addresses CA included in metadata located in the root nodes of the highest hierarchy are compared, the content address CA* denoted by reference symbol C34 within the copy source file system 200 is different from the content address CA within the copy destination file system 300 (refer to reference numeral (21)). In other words, the content address CA* denoted by reference symbol C34 does not exist in the copy destination file system 300. Therefore, metadata in the index node of a lower hierarchy referred to by the content address CA* denoted by reference symbol C34 is checked.

Subsequently, when content addresses CA located in the index nodes are compared, the content address CA* denoted by reference symbol C33 within the copy source file system 200 is different from the content address CA within the copy destination file system 300 (refer to reference numeral (22)). In other words, the content address CA* denoted by reference symbol C33 does not exist in the copy destination file system 300. Therefore, metadata in the leaf node of a lower hierarchy referred to by the content address CA* denoted by reference symbol C33 is checked.

Subsequently, when content addresses CA located in the leaf nodes are compared, the content addresses CA* denoted by reference symbols C31 and C32 within the copy source file system 200 are different from the content addresses CA within the copy destination file system 300 (refer to reference numeral (23)). In other words, the content addresses CA* denoted by reference symbols C31 and C32 do not exist in the copy destination file system 300. Therefore, the data stored in the Inode denoted by reference symbols D31 and D32 referred to by the content addresses CA* denoted by reference symbols C31 and C32 are specified as update data.

After that, the data specified as update data within the copy source file system 200 and the metadata having been followed are copied into the copy destination file system 300. At this moment, the update data having been specified, the metadata that includes the content addresses referring to the update data, and the metadata of the higher hierarchy referring to the abovementioned metadata are copied into the copy destination file system 300. In other words, only data within the copy source file system 200 having been changed is copied into the copy destination file system 300.

<Second Exemplary Embodiment>

Figure 15:
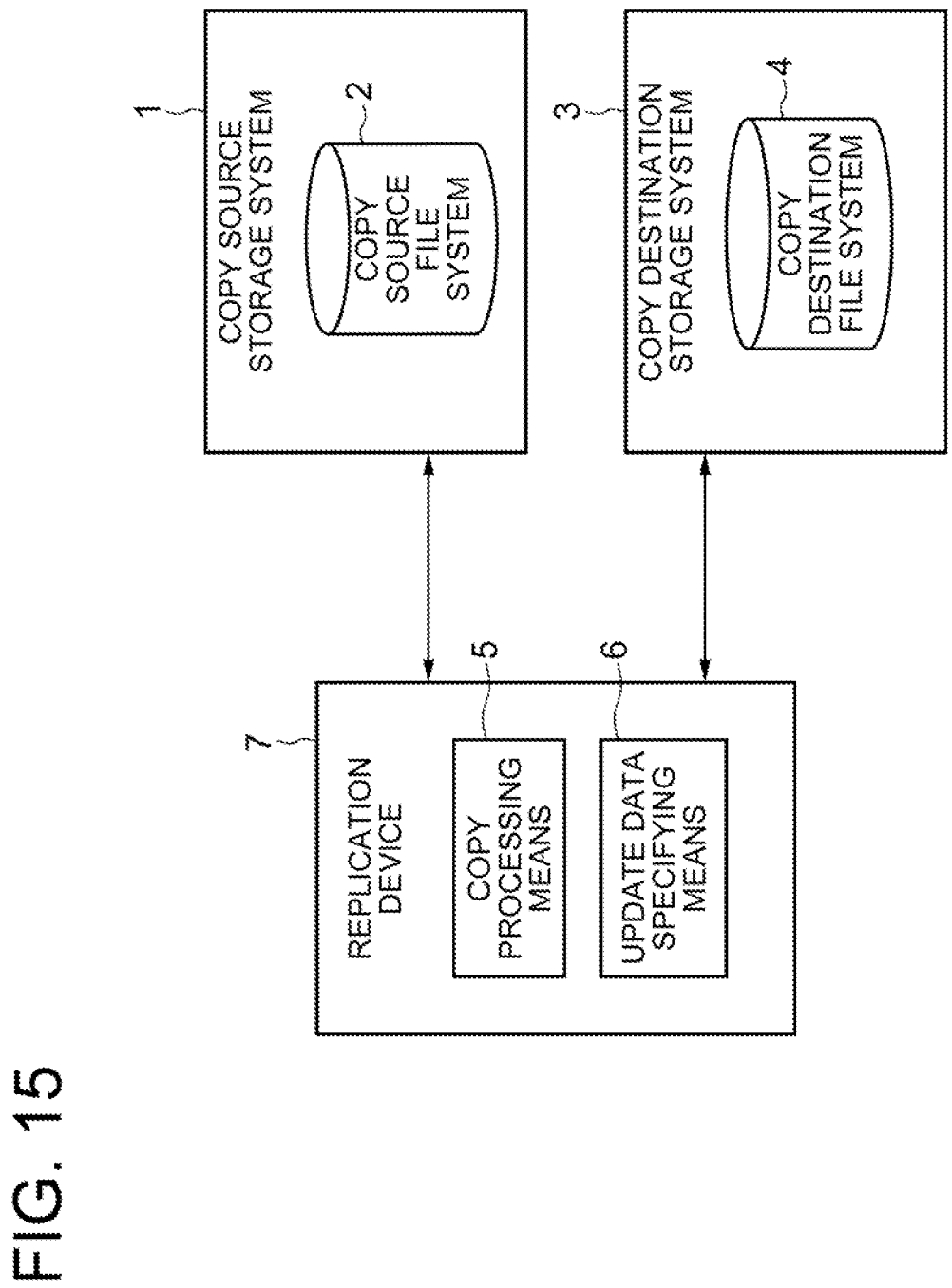
FIG. 15 is a function block diagram showing a configuration of a storage system of a second exemplary embodiment of the present invention.

Next, a second exemplary embodiment of the present invention will be described with reference to FIG. 15. FIG. 15 is a function block diagram showing a configuration of a storage system of this exemplary embodiment. In this exemplary embodiment, the storage system will be schematically described.

As shown in FIG. 15, a storage system of this exemplary embodiment includes: a copy source storage system 1 configured to store a copy source file system 2 that includes storage data and key data referring to the storage data and being unique depending on the data referred to thereby; and a copy destination storage system 3 configured to become a copy destination of the copy source file system stored in the copy source storage system.

Then, the storage system also includes: a copy processing means 5 configured to copy the copy source file system 2 stored in the copy source storage system 1 into the copy destination storage system 3, and form a copy destination file system 4 in the copy destination storage system 3; and an update data specifying means 6 configured to compare the key data within the copy source file system 2 with the key data within the copy destination file system 4 and specify, as update data, the storage data within the copy source file system 2 referred to by the key data within the copy source file system 2, the storage data not existing in the copy destination file system 4.

Furthermore, the copy processing means 5 is configured to copy the update data stored within the copy source file system 2 into the copy destination file system 4.

In FIG. 15, the copy processing means 5 and the update data specifying means 6 are installed in a replication device 7 separately, but may be installed in the copy source storage system 1 and/or the copy destination storage system 3.

According to the storage system configured as described above, the copy source storage system stores storage data and key data referring to the storage data, which form the copy source file system. By copying this copy source file system into the copy destination storage system, a copy file system having the same content is formed within the copy destination storage system. After that, when update data is stored within the copy source file system, key data referring to this update data is generated or updated so as to include information unique to the update data.

Then, after that, at the time of copying the copy source file system into the copy destination storage system, a process of updating only a difference updated in the copy source file system is executed. To be specific, firstly, the key data within the copy source file system is compared with the key data within the copy destination file system. In a case that the respective key data coincide, it is determined that there is no update data, and the copying process is stopped. On the other hand, in a case that the key data is different, storage data referred to by the different key data in the copy source file system is specified as update data. After that, the specified update data is copied.

Thus, according to the present invention, there is no need to compare all of the storage data of the copy source file system and the copy destination file system, and it is possible to specify storage data having been updated by comparing key data referring to the storage data. Therefore, it is possible to control time and load required for the data copying process, and it is possible to inhibit decrease of the performance of the system.

Further, in the replication system described above, there are data referring to the storage data and data referring to metadata including one or plural other key data, as the key data, and the key data form a hierarchical structure. Then, the update data specifying means is configured to, in a case that the key data within the copy source file system that does not exist in the copy destination file system refers to the metadata as a result of comparison of the key data, compare the key data included in the metadata as a comparison target with the key data within the copy destination file system.

Further, in the replication system described above, the update data specifying means is configured to compare the key data and follow a reference destination of the key data within the copy source file system that does not exist in the copy destination file system, thereby specifying the update data.

Further, in the replication system described above, the update data specifying means is configured to compare the key data in order of location from a higher hierarchy to a lower hierarchy and follow a reference destination of the key data.

Thus, in the case of a hierarchical structure in which metadata including key data referring to storage data is refers to by other key data, it is possible to speedily specify update data by following key data within the copy source file system that does not exist in the copy destination file system.

Further, in the replication system described above, the copy processing means is configured to copy update data stored in the copy source file system and specified by the update data specifying means, and the key data considered by the update data specifying means not to exist within the copy destination file system, into the copy destination file system.

Further, in the replication system described above, the copy processing means is configured to copy update data stored in the copy source file system and specified by the update data specifying means, the key data considered by the update data specifying means not to exist within the copy destination file system, and the metadata including the key data, into the copy destination file system.

Furthermore, in the replication system described above includes a unique information generating means configured to generate unique information depending on data referred to by the key data and to include the information into the key data.

Then, in the replication system described above, the unique information generating means is configured to, when the data referred to by the key data changes by storage of the update data into the copy source file system, generate unique information depending on the data and include the information into the key data referring to the data.

Further, another exemplary embodiment of the present invention is the abovementioned replication device including: a copy processing means configured to copy a copy source file system stored in a copy source storage system storing the copy source file system that includes storage data and key data referring to the storage data and being unique depending on the data referred to thereby, into a copy destination storage system, and form a copy destination file system in the copy destination storage system; and an update data specifying means configured to compare the key data within the copy source file system with the key data within the copy destination tile system and specify, as update data, the storage data within the copy source file system referred to by the key data within the copy source file system, the storage data not existing in the copy destination file system, and the copy processing means is configured to copy the update data stored within the copy source file system into the copy destination file system.

Further, in the replication device described above: as the key data, there are data referring to the storage data and data referring to metadata including one or plural other key data, and the key data form a hierarchical structure; and the update data specifying means is configured to, in a case that the key data within the copy source file system that does not exist in the copy destination file system refers to the metadata as a result of comparison of the key data, compare the key data included in the metadata as a comparison target with the key data within the copy destination file system.

Further, the aforementioned replication system or replication device can be realized by installing a computer program into an information processing device. To be specific, a computer program of another exemplary embodiment of the present invention includes instructions for causing an information processing device to realize: a copy processing means configured to copy a copy source file system stored in a copy source storage system storing the copy source file system that includes storage data and key data referring to the storage data and being unique depending on the data referred to thereby, into a copy destination storage system, and form a copy destination file system in the copy destination storage system; and an update data specifying means configured to compare the key data within the copy source file system with the key data within the copy destination file system and specify, as update data, the storage data within the copy source file system referred to by the key data within the copy source file system, the storage data not existing in the copy destination file system.

Then, the copy processing means is configured to copy the update data stored within the copy source file system into the copy destination file system.

Further, in the computer program described above, in a case that there are data referring to the storage data and data referring to metadata including one or plural other key data, as the key data, and the key data form a hierarchical structure, the update data specifying means is configured to, in a case that the key data within the copy source file system that does not exist in the copy destination file system refers to the metadata as a result of comparison of the key data, compare the key data included in the metadata as a comparison target with the key data within the copy destination file system.

Further, a replication method of another exemplary embodiment of the present invention executed by operation of the aforementioned replication system includes: copying a copy source file system stored in a copy source storage system storing the copy source file system that includes storage data and key data referring to the storage data and being unique depending on the data referred to thereby, into a copy destination storage system, and forming a copy destination file system in the copy destination storage system; comparing the key data within the copy source file system with the key data within the copy destination file system, and specifying, as update data, the storage data within the copy source file system referred to by the key data within the copy source file system, the storage data not existing in the copy destination file system: and copying the update data stored within the copy source file system into the copy destination file system.

Further, in the replication method described above, in a case that there are data referring to the storage data and data referring to metadata including one or plural other key data, as the key data, and the key data form a hierarchical structure, the update data specifying means is configured to, in a case that the key data within the copy source file system that does not exist in the copy destination file system refers to the metadata as a result of comparison of the key data, compare the key data included in the metadata as a comparison target with the key data within the copy destination file system.

Inventions of a replication device, a computer program and a replication method having the abovementioned configurations have like actions as the abovementioned replication system, and therefore, can achieve the object of the present invention mentioned above.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-041894, filed on Feb. 25, 2009, the disclosure of which is incorporated herein in its entirety by reference.

Industrial Applicability

The present invention can be utilized for a system configured by connecting a plurality of storage systems and configured to execute replication between the storage systems, and has industrial applicability.

DESCRIPTION OF REFERENCE NUMERALS 1 copy source storage system
2 copy source file system
3 copy destination storage system
4 copy destination file system
5 copy processing means
6 update data specifying unit
7 a replication device
10 master storage system
10A accelerator system
10B storage node
11 master replicator
12 master file system
13 copy source file system
20 replica storage system
21 replica replicator
22 replica file system
23 copy destination file system
31 backup system
32 backup target device
101 input device
102 copy unit
103 file system access unit
121 update file specifying unit
122 copy processing unit
130 file updating unit
131 file attribute information updating unit
132 file attribute information retrieving agent
133 file data writing-out unit
134 file data retrieving unit
135 file management region retrieving unit
136 file management region updating unit
137 data block writing-out unit
138 data block retrieving unit
139 unique key generating unit
201, 301 file system management region
211, 311 file management information part key information
221, 321 file management block key information
231, 232, 331, 332 file management block key information
241, 242, 341, 342 file management block
251, 252, 253, 351, 352, 361 file attribute part key information
261, 263, 361, 362, 363 file attribute part
200 copy source file system
300 copy source file system.

The invention claimed is:

1. A replication system comprising:

a copy source storage system configured to store a copy source file system that includes storage data and key data referring to the storage data and being unique depending on the data referred to thereby; and a copy destination storage system configured to become a copy destination of the copy source file system stored in the copy source storage system, the replication system also comprising:

a copy processing unit configured to copy the copy source file system stored in the copy source storage system into the copy destination storage system, and form a copy destination file system in the copy destination storage system; and an update data specifying unit configured to compare the key data within the copy source file system with the key data within the copy destination file system and specify, as update data, the storage data within the copy source file system referred to by the key data within the copy source file system, the storage data not existing in the copy destination file system, wherein the copy processing unit is configured to copy the update data stored within the copy source file system into the copy destination file system, and as the key data, there are a key data referring to the storage data and a higher key data referring to the metadata including a plurality of other key data, which form a hierarchical structure with each other, and by being generated based on a content of the data referred to thereby, each of the key data is configured to, when the storage data is updated, update the key data referring to said storage data, and update the higher key data referring to metadata including said key data; and the update data specifying unit configured to, in a case that the key data within the copy source file system that does not exist in the copy destination file system refers to the metadata as a result of comparison of the key data, compare the key data included in the metadata as a comparison target with the key data within the copy destination file system.

2. The replication system according to claim 1, wherein the update data specifying unit is configured to compare the key data and follow a reference destination of the key data within the copy source file system that does not exist in the copy destination file system, thereby specifying the update data.

3. The replication system according to claim 2, wherein the update data specifying unit is configured to compare the key data in order of location from a higher hierarchy to a lower hierarchy and follow a reference destination of the key data.

4. The replication system according to claim 1, wherein the copy processing unit is configured to copy update data stored in the copy source file system and specified by the update data specifying unit, and the key data considered by the update data specifying unit not to exist within the copy destination file system, into the copy destination file system.

5. The replication system according to claim 1, wherein the copy processing unit is configured to copy update data stored in the copy source file system and specified by the update data specifying unit, the key data considered by the update data specifying unit not to exist within the copy destination file system, and the metadata including the key data, into the copy destination file system.

6. The replication system according to claim 1, comprising a unique information generating unit configured to generate unique information depending on data referred to by the key data and to include the information into the key data.

7. The replication system according to claim 6, wherein the unique information generating unit is configured to, when the data referred to by the key data changes by storage of the update data into the copy source file system, generate unique information depending on the data and include the information into the key data referring to the data.

8. A replication device comprising:
a copy processing unit configured to copy a copy source file system stored in a copy source storage system storing the copy source file system that includes storage data and key data referring to the storage data and being unique depending on the data referred to thereby, into a copy destination storage system, and form a copy destination file system in the copy destination storage system; and
an update data specifying unit configured to compare the key data within the copy source file system with the key data within the copy destination file system and specify, as update data, the storage data within the copy source file system referred to by the key data within the copy source file system, the storage data not existing in the copy destination file system,
wherein the copy processing unit is configured to copy the update data stored within the copy source file system into the copy destination file system, and
as the key data, there are a key data referring to the storage data and a higher key data referring to metadata including a plurality of other key data which form a hierarchical structure to each other, and by being generated based on a content of the data referred to thereby, each of the key data is configured to, when the storage data is updated, update the key data referring to said storage data, and update the higher key data referring to metadata including the key data; and
the update data specifying unit configured to, in a case that the key data within the copy source file system that does not exist in the copy destination file system refers to the metadata as a result of comparison of the key data, compare the key data included in the metadata as a comparison target with the key data within the copy destination file system.

9. A replication method comprising:
copying a copy source file system stored in a copy source storage system storing the copy source file system that includes storage data and key data referring to the storage data and being unique depending on the data referred to thereby, into a copy destination storage system, and forming a copy destination file system in the copy destination storage system;
comparing the key data within the copy source file system with the key data within the copy destination file system, and specifying, as update data, the storage data within the copy source file system referred to by the key data within the copy source file system, the storage data not existing in the copy destination file system; and
copying the update data stored within the copy source file system into the copy destination file system, and
in a case that, as the key data, there are a key data referring to the storage data and a higher key data referring to metadata including a plurality of other key data which form a hierarchical structure to each other, and by being generated based on a content of the data referred to thereby, each of the key data is configured to, when the storage data is updated, update the key data referring to the storage data, and update the higher key data referring to metadata including the key data,
when the key data within the copy source file system that does not exist in the copy destination file system refers to the metadata as a result of comparison of the key data at the time of specification of the update data, comparing the key data included in the metadata as a comparison target with the key data within the copy destination file system.

* * * * *